US009421928B2

(12) United States Patent
Baur et al.

(10) Patent No.: US 9,421,928 B2
(45) Date of Patent: Aug. 23, 2016

(54) ELECTRONIC CONTROL SYSTEM FOR A SAFETY DEVICE OF A MOTOR VEHICLE

(75) Inventors: Richard Baur, Pfaffenhofen (DE); Stephan Muhr, Munich (DE); Simon Schilling, Munich (DE); Michael Hackenberg, Munich (DE); Marcus Weidner, Weilheim (DE)

(73) Assignee: Bayerische Motoren Werke Akteingesellschaft, Munich (DE)

( * ) Notice: Subject to any disclaimer, the term of this patent is extended or adjusted under 35 U.S.C. 154(b) by 80 days.

(21) Appl. No.: 13/478,715

(22) Filed: May 23, 2012

(65) Prior Publication Data
US 2012/0303220 A1    Nov. 29, 2012

(30) Foreign Application Priority Data
May 24, 2011    (DE) .......................... 10 2011 076 367

(51) Int. Cl.
*B60R 21/00*    (2006.01)
*B60R 21/01*    (2006.01)
(Continued)

(52) U.S. Cl.
CPC .............. *B60R 21/01* (2013.01); *G01P 15/18* (2013.01); *G01P 21/00* (2013.01)

(58) Field of Classification Search
CPC .. G01P 15/18; G01P 15/125; G01P 15/0802; G01P 15/0891; G01P 1/023; G01P 15/093; G01P 13/02; G01P 15/06; G01P 2015/0814; G01P 15/131; G01P 1/00
USPC ........ 701/1, 41, 45, 472; 702/101, 141, 147, 702/150, 151, 188, 94; 73/493, 514.16
See application file for complete search history.

(56) References Cited

U.S. PATENT DOCUMENTS

| 5,890,099 | A | 3/1999 | Abendroth |
| 6,229,437 | B1 | 5/2001 | Schmid et al. |
| 6,292,728 | B1 * | 9/2001 | Masegi ........................... 701/45 |

(Continued)

FOREIGN PATENT DOCUMENTS

| DE | 42 39 201 A1 | 5/1994 |
| DE | 196 25 058 A1 | 1/1998 |

(Continued)

OTHER PUBLICATIONS

Matthais Benzinger et al. DE10162689A1—Method for monitoring sensors within a motor vehicle to ensure their correct using a system with a high degree of built-in redundancy . . . , published Jul. 18, 2002, Daimler Chrysler Ag; file name attached: DE10162689A1—Method for monitoring sensors_machine translation.*

(Continued)

Primary Examiner — Jelani Smith
(74) Attorney, Agent, or Firm — Crowell & Moring LLP

(57) ABSTRACT

An electronic control system for a safety device of a motor vehicle includes a first sensor for a motion quantity, a computer for converting the motion quantity to a triggering signal for the safety device, and a second sensor for checking the plausibility of the sensor signal supplied by the first sensor. The two sensors are arranged with an identical construction and/or effect and at an at least approximately identical location on a printed circuit board such that, in a proper operating mode, their output signals have different preceding signs and are identical with respect to their amount over their entire operating range.

3 Claims, 2 Drawing Sheets

(51) Int. Cl.
  *G01P 15/18* (2013.01)
  *G01P 21/00* (2006.01)

(56) References Cited

U.S. PATENT DOCUMENTS

| | | |
|---|---|---|
| 6,487,482 B1 | 11/2002 | Mattes et al. |
| 2005/0126022 A1* | 6/2005 | Hansberry et al. ............ 33/313 |
| 2006/0042382 A1* | 3/2006 | DCamp et al. ................. 73/493 |
| 2006/0164227 A1* | 7/2006 | Auer et al. ................. 340/457.1 |
| 2006/0212258 A1* | 9/2006 | Fendt et al. ................... 702/141 |
| 2007/0032951 A1* | 2/2007 | Tanenhaus et al. ........... 701/220 |
| 2010/0161268 A1 | 6/2010 | Gottfriedsen et al. |
| 2011/0131012 A1* | 6/2011 | Czaja et al. ................... 702/188 |
| 2012/0017676 A1* | 1/2012 | Schmid ............. G01C 19/5755 73/504.02 |
| 2012/0232832 A1* | 9/2012 | Zhang et al. ................. 702/141 |

FOREIGN PATENT DOCUMENTS

| | | |
|---|---|---|
| DE | 198 07 124 A1 | 9/1999 |
| DE | 101 62 689 A1 | 7/2002 |
| DE | 10162689 A1 * | 7/2002 |
| DE | 102 50 321 A1 | 6/2003 |
| DE | 103 06 707 A1 | 8/2004 |
| DE | 10 2008 062 972 A1 | 6/2010 |
| SE | 200602161 A * | 4/2008 |
| WO | WO 97/32757 A1 | 9/1997 |
| WO | WO 2009112526 A1 * | 9/2009 ............ G01C 19/56 |

OTHER PUBLICATIONS

WO 2002055356 A1_ machine translation.*
SE 200602161 A_ Text and Figure.*
WO2009112526_machine translation.pdf.*
German Search Report dated Aug. 2, 2011 including partial English-language translation (Ten (10) pages).

* cited by examiner

ELECTRONIC CONTROL SYSTEM FOR A SAFETY DEVICE OF A MOTOR VEHICLE

CROSS-REFERENCE TO RELATED APPLICATION

This application claims priority under 35 U.S.C. §119 from German Application No. DE 10 2011 076 367.8, filed May 24, 2011, the entire disclosure of which is herein expressly incorporated by reference.

BACKGROUND AND SUMMARY OF THE INVENTION

The invention relates to an electronic control system for a safety device of a motor vehicle, having a first sensor for a motion quantity, a computer for converting the motion quantity to a triggering signal for the safety device, and a second sensor for checking the plausibility of the sensor signal supplied by the first sensor.

Such a control system is known from German Patent document DE 196 25 058 A. For achieving an output signal that is as faultless as possible for a rotation rate to be determined, the two sensors operate according to different measuring principles. In this case, a combination of two mutually independent measuring systems is carried out, the combination taking place such that the disadvantages of the individual systems are to disappear and the advantages of the individual systems are to be utilized. The output signals of both sensor systems are linked with one another, the linking taking place in corresponding signal evaluation devices, which are constructed, for example, as a microprocessor.

For improving the system reliability, it is also known to use a diversified redundancy. For example, for an airbag control system, this applies to a plurality of external sensors which are also based on physically different operating principles. Thus, for example, door pressure sensors are installed in the doors and determine a volume change of the interior door volume caused by a crash. In addition, the forces acting upon the vehicle are detected by use of acceleration sensors (such as upfront sensors in the front section, B or C column "satellite" sensors, etc.). In addition, these sensors, by which, when needed, (for example, in the event of a crash), a clear triggering decision has to be detectable, have very high quality and availability requirements.

In order to meet these very high requirements, currently high-expenditure self-diagnoses and diagnoses within the control system are being carried out for sensors. However, these are primarily used for discovering faults and failures in the operation of the system (such as accidental hardware failures of electrical components). In addition, a triggering decision/functional decision, for safety reasons, is always checked for plausibility while including redundant data.

In order to be able to judge the confidence level of the data/signal quantity, additional sensors are used in the control device as reference sensors for checking the plausibility of the "event". Sensors of identical constructions can also be used for this purpose.

Although, when redundant sensors are used, the influence of individual faults can be reduced, common as well as identical, particularly systematic, faults exercise a dominant influence. Such faults are called Common Cause Failure (=CCF, also called "Common Mode Failure"), i.e. faults of a common cause. One example are components which, for safety reasons, simultaneously work on the same object several times and fail at the same time (all 4 brakes fail simultaneously).

Particularly in the field of chassis sensors for an acceleration in the low-G range (0 g to 5 g) and for the detection of rotation rates, it is found to be difficult to achieve safety with respect to common cause failure (CCF) by way of diversified redundancy, for example, in the form of diversified sensors.

Because of the lack of diversified redundancy, particularly the dominant common cause failures (CCFs) of sensors, CCFs on the transmission route from the sensor to a signal read-in device, CCFs in this device, CCFs on the transmission route to a signal evaluation device, as well as CCFs in the evaluation device, cannot be detected.

It is an object of the invention to create an electronic control system of the above-mentioned type which provides a maximum amount of operating safety at low expenditures.

According to the invention, an electronic control system is provided for a safety device of a motor vehicle, having a first sensor for a motion quantity, a computer for converting the motion quantity to a triggering signal for the safety device, and a second sensor for checking the plausibility of the sensor signal supplied by the first sensor. The two sensors are arranged with an identical construction and/or effect and at an at least approximately identical location on a printed circuit board such that, in a proper operating mode, their output signals have different preceding signs and are identical with respect to their amounts (same absolute value) over the entire operating range.

In addition to the uniformity of construction and operation of the two sensors, the arrangement at an approximately identical location on a printed circuit board and its orientation are of decisive significance.

In the proper operating mode, the two sensor output signals therefore have different preceding signs and are identical with respect to their amount (same absolute value) over the entire operating range.

The arrangement of the two sensors according to the invention differs from sensors of the same construction and effect, which are arranged in a mutually spatially separate manner, by their signal curve. The spatial separation leads to a different dynamic signal curve at the individual sensors, caused by a different mechanical coupling of the sensors, for example, a different vibration behavior (especially amplitude differences, phase shifts, and different resonance frequencies). Specifically, in the automotive area in control devices, a different vibration behavior is observed even if sensors are positioned on the same printed circuit board. The different mechanical coupling is mainly the result of the different distance from the fastening points. In contrast, in the case of the arrangement according to the invention, the two signal curves have different preceding signs and are identical in their amounts (absolute values). As a result, CCF phenomena can be avoided.

Advantageous embodiments of the invention which apply to a rotation rate sensor, an acceleration sensor or a combined acceleration/rotation rate sensor are further described herein.

Other objects, advantages and novel features of the present invention will become apparent from the following detailed description of one or more preferred embodiments when considered in conjunction with the accompanying drawings.

DETAILED DESCRIPTION OF THE DRAWINGS

If possible, the two sensors generally are to be installed without a spatial separation and in such a manner that they supply output signals that are identical with respect to their amount but have inverse preceding signs. In the case of the arrangement of FIG. 1, this specifically takes place by arranging two rotation rate sensors 1 and 2 on the top side 3 and the bottom side 4 of a printed circuit board 5. The output signals of the two sensors 1 and 2 determine the rotation rate in the z-direction and, as in the case of the double arrangement of the sensors illustrated in the additional figures, are supplied in a parallel manner to a computer for the safety device, which computer is not shown and in which, as required, they will be processed and/or post-processed and filtered, and which, as required, activate the safety device. The safety device may, for example, be an airbag.

Figure 1:
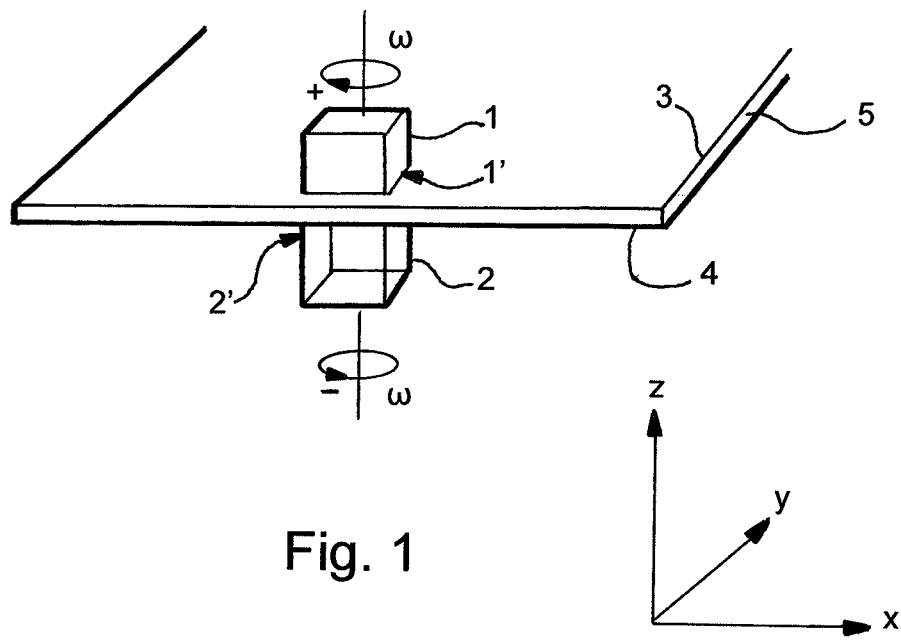
FIG. 1 is a view of an arrangement of rotation rate sensors according to an embodiment of the invention.

In the arrangement of FIG. 1, the fastening points 1' and 2' of the sensors 1, 2 have the same positioning in the x-y direction. A spatial separation of the fastening points 1'/2' in the x-y direction is thereby largely avoided. During a rotation about the z-axis, sensor 1 supplies a positive rotation rate signal and sensor 2 supplies a negative signal of an identical amount (or absolute value). The indicated x, y and z-direction coordinates relate to the printed circuit board on which the sensors 1 and 2 are fastened. The printed circuit board 5 itself may be installed in the vehicle in a horizontal or, for example, vertical fashion.

If the two sensors 1 and 2 are homogeneously redundant, an uncomplicated signal evaluation will be possible in the evaluation unit (not shown) of the computer as well as—if desired—a prefiltering of the sensor data in a read-in unit on the input side. CCFs, as, for example, those mentioned above, can be easily detected by the expectation of the evaluation unit to receive data of an identical magnitude but with inverse preceding signs.

Figure 2:
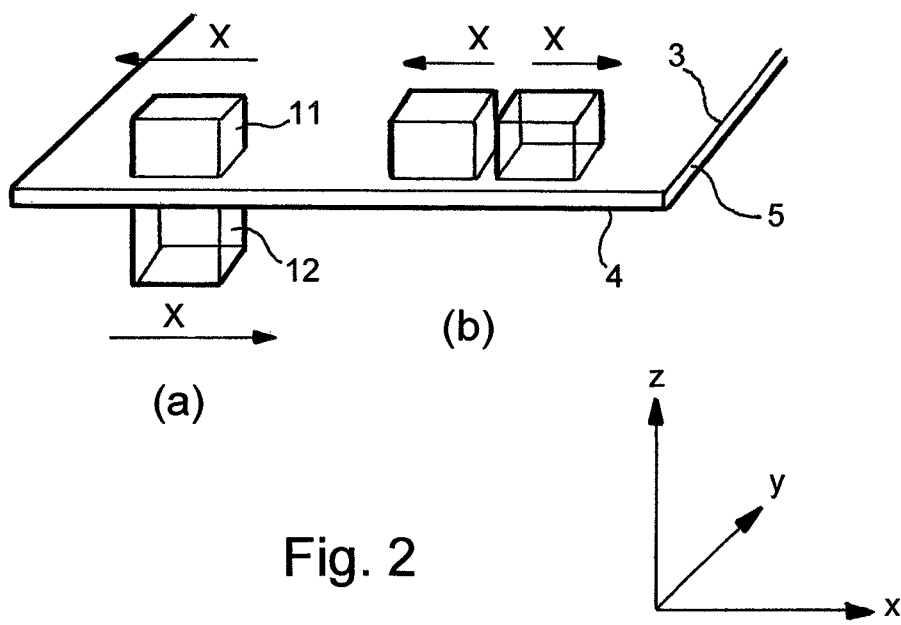
FIG. 2 is a view of an arrangement of acceleration sensors according to an embodiment of the invention.

In the arrangement of FIG. 2, two acceleration sensors 11 and 12 for determining an acceleration in the x-direction are arranged above one another on both sides 3 and 4 of the printed circuit board 5 (*a*) or side-by-side on one side of the printed circuit board 5 (*b*). In this case, it is significant that the orientation of the two sensors is opposite, so that one sensor supplies a positive output signal and the other sensor supplies a negative output signal corresponding to the momentary acceleration in the x-direction.

Figure 3:
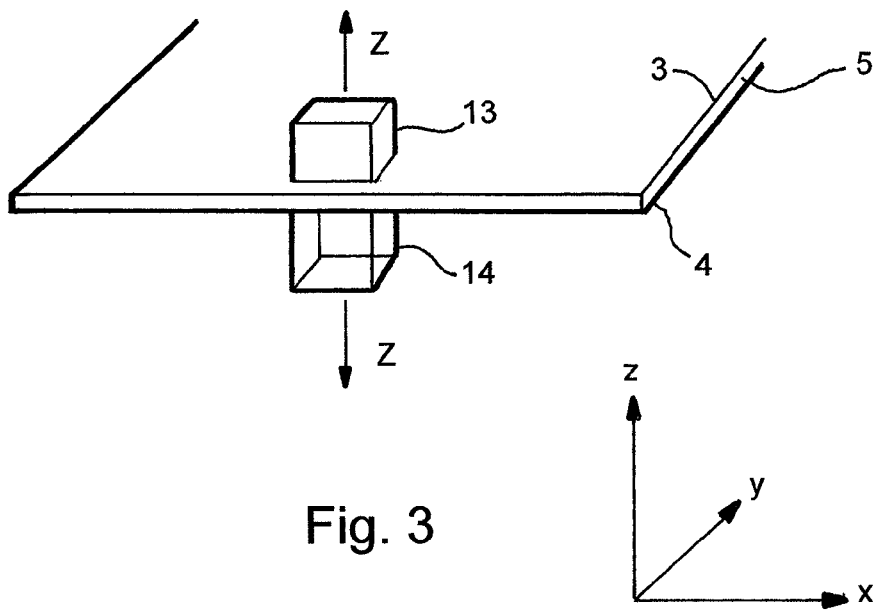
FIG. 3 is a view of a further arrangement of acceleration sensors according to the invention.

In the arrangement of FIG. 3, two acceleration sensors 13 and 14 for determining an acceleration in the z-direction are arranged above one another on both sides 3 and 4 of the printed circuit board 5. Here also, the orientation of the two sensors will be opposite. One sensor will supply a positive output signal and the other sensor will supply a negative output signal corresponding to the momentary acceleration in the z-direction.

Figure 4:
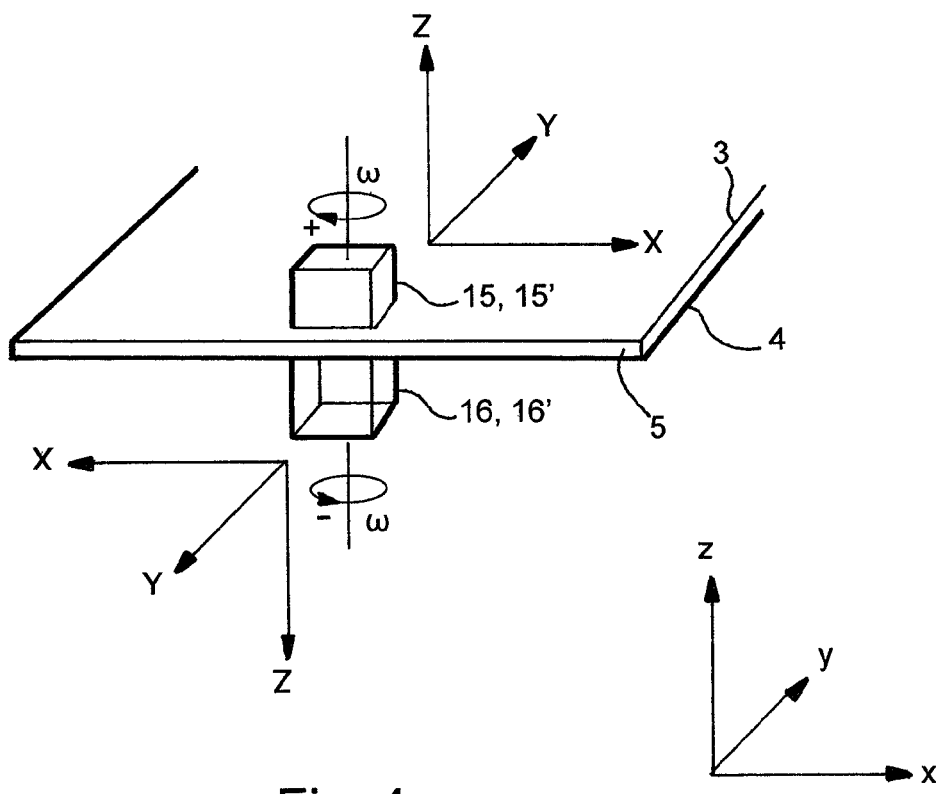
FIG. 4 is a view of an arrangement of combined rotation rate/acceleration sensors according to an embodiment of the invention.

Finally, FIG. 4 illustrates the arrangement of combined rotation rate/acceleration sensors 15 and 16 with their housings 15' and 16' above one another on both sides 3 and 4 of the printed circuit board situated in the x-/y-plane. The orientation in the x- and y-direction is opposite in each case. As a result, during a rotation about the z-axis or an acceleration in the x- and/or y-direction, the output signals are diametrically opposite and, in each case, identical with respect to the amount. In this case also, CCF effects can be sustainably avoided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electronic control system for a safety device of a motor vehicle equipped with a computer that receives sensor signals and outputs a triggering signal for the safety device, the electronic control system comprising:
   a printed circuit board having a defined geometry; and
   first and second motion sensors arranged on opposing sides of said printed circuit board, the first and second motion sensors having at least one of an identical construction and an identical operating effect; wherein:
   the first and second motion sensors are arranged at an approximately identical location on the printed circuit board,
   the first motion sensor provides a first output signal,
   the second motion sensor provides a second output signal, and
   the computer determines that the first output signal is plausible based on a determination that the second output signal has an opposite sign and an identical amount as compared with the first output signal,
   wherein the first and second sensors are rotation rate sensors that determine rotation rates about a vertical axis, the first and second sensors being fastened via a common footprint on a top and a bottom side, respectively, of the printed circuit board arranged horizontally with respect to the vertical axis.

2. The electronic control system according to claim 1, wherein the first and second sensors are acceleration sensors that determine an acceleration in a horizontal direction, the acceleration sensors being fastened side-by-side on a same side of the printed circuit board or one above another on opposite sides of the printed circuit board, the first and second sensors having an opposite direction orientation.

3. The electronic control system according to claim 1, wherein each of the first and second sensors comprises a sensor housing in which is arranged a rotation rate sensor and an acceleration sensor; and
   wherein the housings of the first and second sensors are arranged above one another on a top side and a bottom side, respectively, of the printed circuit board and, are arranged rotated by 180° in an x-direction and a y-direction, respectively.

* * * * *